United States Patent

[11] 3,596,006

[72] Inventor David W. Lawhon
Los Angeles, Calif.
[21] Appl. No. 806,968
[22] Filed Mar. 13, 1969
[45] Patented July 27, 1971
[73] Assignee Capitol Records, Inc.
Hollywood, Calif.

[54] CASSETTE TAPE-STRENGTHENING PATCH AND OPTICAL OPENING
12 Claims, 4 Drawing Figs.

[52] U.S. Cl. .......... 179/100.2
A, 179/100.2 S, 179/100.2 Z, 274/41.4, 242/188
[51] Int. Cl. .......... G11b 5/78,
G11b 15/29, G11b 23/42
[50] Field of Search .......... 179/100.2
A, 100.2 S, 100.2 Z; 117/122 P; 274/41.4;
242/188, 189

[56] References Cited
UNITED STATES PATENTS 2,726,222 12/1955 Palmquist .......... 117/122 P
2,971,716 2/1961 Sampson .......... 179/100.2
3,217,996 11/1965 Berner .......... 242/188

*Primary Examiner*—Bernard Konick
*Assistant Examiner*—J. Russell Goudeau
*Attorney*—Spensley, Horn & Lubitz

ABSTRACT: A combination of magnetic recording tape adapted to be mounted in a tape cassette and a strengthening patch therefore wherein the patch is connected to the recording tape at a point which would become worn by the tape cassette advance mechanism, the wear occuring when the end of tape is reached. An opening is inserted through the combination of the recording tape and the patch for optical sensing of the end of tape.

INVENTOR.
DAVID W. LAWHON,

BY HIS ATTORNEYS
Spensley & Horn

CASSETTE TAPE-STRENGTHENING PATCH AND OPTICAL OPENING

BACKGROUND OF THE INVENTION

1. Field of the Invention

The present invention relates to the field of recording tape, and more specifically to a construction to prevent the recording tape from breaking due to wear caused by the tape cassette advance mechanism.

2. Prior Art

With the increased popularity of cassette tape recorders and playback units, a problem relating to the wearing and eventual breaking of the tape has been given increased attention. The conventional tape cassette has the tape mounted on two reels. The tape is firmly attached to the reels to prevent the tape from becoming unfastened when the tape supply is exhausted. The tape must not become unfastened because the tape cassette is sealed. If the tape was to become detached from a reel, the typical user would be unable to reattach the tape without damaging the tape and/or the tape cassette.

A standard tape cassette recorder/playback unit advances the tape through the use of a capstan-idler wheel combination mounted at an access point on the tape cassette. One form of the standard tape cassette recorder/playback unit has no provision to stop the advance mechanism when the end of the tape is reached, therefore the tape is worn by the continuous movement of the capstan against the idler wheel while the tape remains stationary, the wear always occurring at the same position on the tape. A second from of tape cassette recorder/playback unit utilizes optical sensing to stop the advance mechanism, but this requires the use of a tape cassette which has an open optical path at the ends of the tape.

The prior art discloses two types of tape cassettes. The first type of tape cassette has no provision to avoid the wear caused by either form of tape cassette recorder/playback unit. The magnetic tape is attached directly to the reels, therefore the tape will wear until it breaks. This method cannot make use of the optical sensing units since the tape is opaque and will transmit no light through the tape. The second method disclosed by the prior art is the attachment of a conventional, clear leader material at the ends of the tape, between the end of the tape and the reel, to which the leader, instead of the tape, is attached. The clear leader is heavier than the magnetic tape, therefore it will not be worn by the continuous movement of the capstan-idler wheel combination. In addition, the clear leader will allow for the use of an optical sensing tape cassette recorder/playback unit.

Where the tape is directly attached to the reels, the problems created by the tape cassette recorder/playback units have not been solved. Where a clear leader is used, the breakage problems are solved, but the additional problem of cost is created. The manufacture of a tape cassette wherein clear leader must be attached to the ends of the tape substantially raises the cost of the cassette and therefore impairs its commercial value.

The present invention solves the problems left unsolved by the prior art. By securing a patch to the tape at the point where the movement of the capstan will normally cause deterioration of the tape, the wearing problem will be eliminated. In order to use the tape with tape cassette recorder/playback units having optical sensors, an opening is provided through the tape-patch combination to provide for the transmission of light or reflection through the tape.

SUMMARY OF THE INVENTION

It is an object of the present invention to provide a tape cassette which will withstand wear from the movement of a capstan against an idler wheel.

It is another object of the present invention to provide a tape cassette which will operate with a tape cassette recorder/playback unit which utilizes optical sensors.

It is still another object of the present invention to provide a combination of magnetic recorded tape and a patch therefor which is not expensive to produce.

One form of a conventional tape cassette recorder/playback unit has no provision for recognition of the end of tape, therefore the continued movement of the advancing capstan against the stationary tape may cause the tape to wear and eventually break. To solve this problem the present invention utilizes a patch on the magnetic tape at the position of wear. Since the position of the advancing capstan and corresponding idler wheel is standardized, the position of the patch relative to the end of the tape, can be determined. By securing the patch at the wear point, the tape can be made more durable. When the patch is fastened to the tape, the adhesive used should not cover that portion of the area between the tape and patch which will be under pressure from the capstan and idler wheel. If an adhesive substance fully covers the area between the patch and the tape, the pressure exerted by the capstan against the idler wheel could force the adhesive material out of the patching area thereby making contact with the capstan and/or the idler wheel. An adhesive material on the capstan or idler wheel could cause stretching or other damage to the tape.

Another form of the tape cassette recorder/playback unit utilizes an optical sensor to detect the end of tape. If the end of tape can be detected, the advancing capstan can be stopped thereby eliminating the possibility of tape wear. The present invention can be used with this form of tape cassette recorder/playback unit. An opening is inserted in the patch-tape combination at a position relative to the end of the tape which is consistent with the placement of the optical sensing equipment. When the end of the tape is reached, the optical sensor will detect the end of tape through the use of the opening in the tape and patch therefore providing for a shutdown signal of the tape cassette advance mechanism.

BRIEF DESCRIPTION OF THE DRAWING

The novel features which are believed to be characteristic of the invention both as to its organization and method of operation, will be better understood from the following description considered in connection with the accompanying drawing in which a presently preferred embodiment of the invention is illustrated by way of example. In the drawing.

DESCRIPTION OF A PRESENTLY PREFERRED EMBODIMENT

Figure 1:
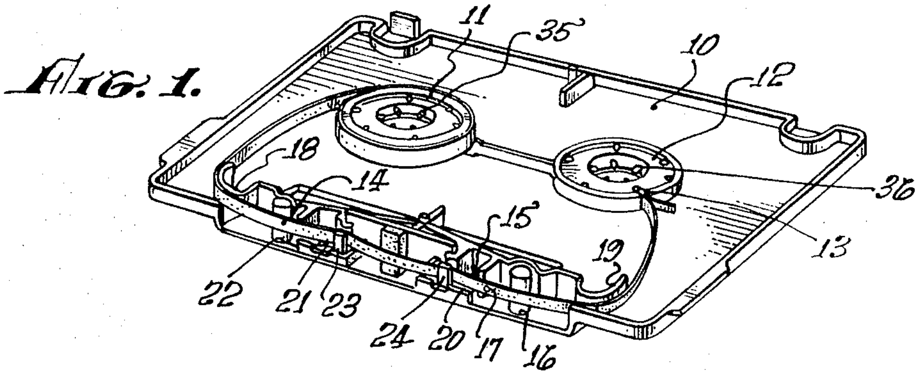
FIG. 1 is a perspective view of the inside of a tape cassette showing a tape made in accordance with the present invention.

A magnetic recording tape 14 mounted on a tape cassette section 10 may be best seen in FIG. 1. Reel 11 and reel 12 are mounted on the tape cassette section 10, with magnetic recording tape 14 attached to the reels 11 and 12. Reel 11 is shown as the takeup reel with reel 12 as the empty reel. With the tape supply of reel 12 exhausted, magnetic recording tape 14 is fastened to reel 12 by a conventional fastener 13. Although it cannot be seen, magnetic recording tape 14 is fastened to reel 11 in the same manner as that shown for reel 12. A conventional tape cassette requires that the tape be fastened to the reels 11 and 12 because the tape cassette is normally sealed. If the magnetic recording tape 14 was not so fastened to reels 11 and 12, there is a danger that a user could damage the tape and/or the cassette. Damage would be caused when a user tried to open the tape cassette and reattach magnetic recoding tape 14 to reels 11 or 12. Magnetic recording tape 14 is routed from reel 12, around the direction guide 19, past the guide pins 23 and 24, and around the direction guide 18 to reel 11. A patch 15 is shown connected to magnetic recording tape 14 with an opening 17 through the combination of the patch 15 and the magnetic tape 14. The holes 16 and 22 in the tape cassette section 10 are access points for the tape cassette advancing capstan 50. Holes 20 and 21 are available for future use for optical sensing.

Figure 2:
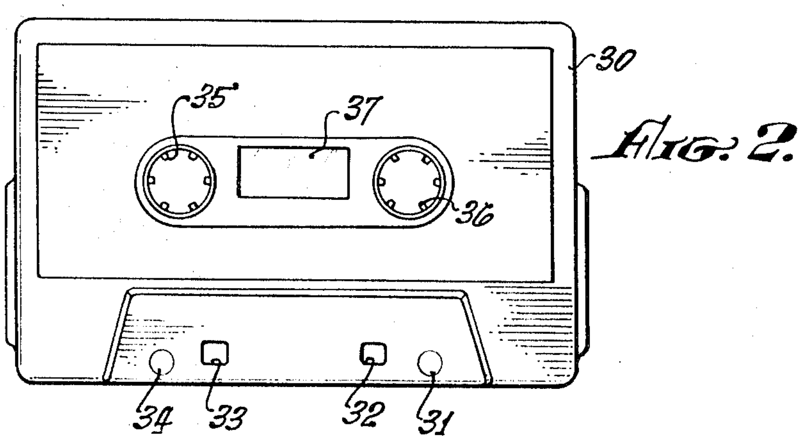
FIG. 2 is a top view of a tape cassette.
Figure 3:
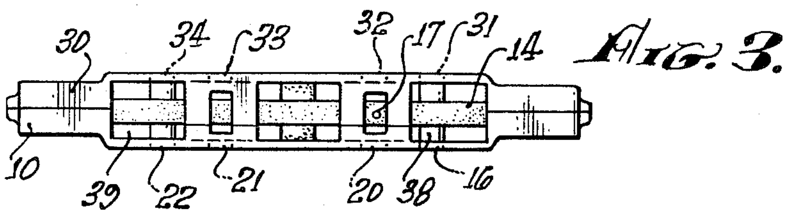
FIG. 3 is a front view of a tape cassette showing the access points to the tape.
Figure 4:
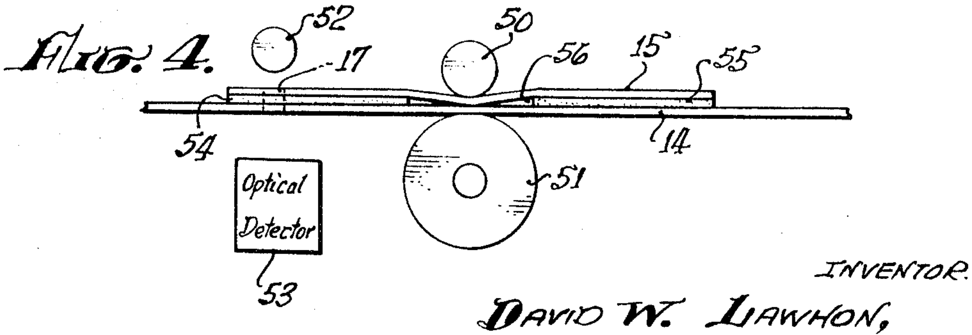
FIG. 4 is an enlarged view of a tape, made in accordance with the present invention, passing through a tape advance mechanism and an optical end-of-tape detector.

When the magnetic recording tape 14 is transferred from reel 12 to reel 11, the magnetic recording tape 14 will eventually be exhausted leaving reel 12 empty. This raises the problem of how to detect the end of tape, or in the alternative, how to compensate for a failure to detect the end of tape. There are two basic forms of tape cassette recorder/playback units. One version of the tape cassette recorder/playback unit has no provision for recognizing the end of tape, therefore even when the magnetic recording tape 14 supply is exhausted, the tape cassette advancing mechanism will continue to operate. Referring briefly to FIG. 2, FIG. 3, and FIG. 4, to wind the magnetic recording tape 14 on reel 12, a capstan 50 is inserted through cassette sections 10 and 30 at holes 31 and 16. The capstan 50 exerts pressure against an idler wheel 51 with the magnetic recording tape 14 between the capstan 50 and idler wheel 51. Since the tape cassette recorder/playback unit does not recognize the end of tape, the capstan 50 will continue to rotate against the stationary magnetic recording tape 14 with the result the magnetic recording tape 14 will deteriorate at that point and eventually break. The conventional tape cassette recorder/playback unit requires the tape cassette to be turned over in order to gain access to the remainder of the magnetic recording tape 14. In this position, the capstan 50 would be reinserted into the holes 34 and 22 of the tape cassette section 30 and 10 respectively.

A second version of the tape cassette recorder/playback unit utilizes an optical sensor to detect when the tape supply is exhausted. Although no specific standard exist, a typical method would be the use of the area between holes 33 and 21 or 32 and 20 of tape cassette section 30 and 10. An alternative method would place the optical sensing equipment in areas 38 and 39 of the tape cassette.

Referring again to FIG. 1, the patch 15 is connected to the tape 14 at the position where the capstan 50 would be inserted into the tape cassette. An opening 17 is inserted through the combination of the patch 15 and the magnetic recording tape 14 to provide for optical sensing of the end of tape. The opening 17 is shown to be between holes 32 and 20 in the tape cassette section 30 and 10 respectively, but this is only for the purpose of example. The opening 17 could be inserted at any position chosen as an optical sensing standard.

The procedure for magnetic recording tape 14 movement can be best seen by reference to FIG. 2 wherein a top view of a tape cassette is shown. The holes 31 and 34 in the tape cassette section 30 are for insertion of capstan 50. The holes 32 and 33 in the tape cassette section 30 can be used for guide pins or for optical sensing equipment. The drive teeth 35 of reel 11 are used to drive reel 11 and keep the magnetic recording tape 14 tight when the tape is being transferred from reel 12 to reel 11. The drive teeth 36 of reel 12 are used to drive reel 12 and to keep the magnetic recording tape 14 tight when magnetic recording tape 14 is being transferred from reel 11 to reel 12. Footage viewer 37 can be utilized by the user to determine the approximate amount of magnetic recording tape 14 on each of reels 11 and 12.

The connection of the patch 15 to the magnetic recording tape 14 and the insertion of the optical sensing opening 17 can be best seen by reference to FIG. 4. The thickness of magnetic recording tape 14 and patch 15 are enlarged for the purpose of clarity. The patch 15 is connected to magnetic recording tape 14 by an adhesive material inserted in areas 54 and 55. The magnetic recording tape 14 and patch 15 combination are shown between a capstan 50 and idler wheel 51. The optical sensing opening 17 is shown between an exemplary optical sensor 53 and light source 52. If the tape cassette recorder/playback unit is not equipped with an end-of-tape detector, the capstan 50 will continue to rotate exerting pressure against the idler wheel 51. Since the magnetic recording tape 14 will be stationary when the tape supply is exhausted, a patch must be connected at this point. The patch will be connected on the nonrecording side of the magnetic recording tape 14, i.e., the side of the magnetic recording tape 14 in contact with the capstan 50. The patch material may be any conventional material used to repair or patch magnetic recording tape. The width of the patch 15 will typically be equal to the width of the magnetic recording tape 14. The patch 15 is connected to the magnetic recording tape 14 by an adhesive material applied in two specific areas 54 and 55. The areas of adhesive material 54 and 55 are placed so that the area 56 (the area disposed between the patch 15 and the magnetic recording tape 14 and under pressure exerted by the capstan 50 and the idler wheel 51) contains no adhesive material. The adhesive material can be any conventional adhesive substance used to join sections of magnetic recording tape. Area tape 57 is left devoid of adhesive material because of the possibility of damage to magnetic recording tape 14. If adhesive material was placed under the constant pressure of the capstan 50 and the idler wheel 51, the adhesive material would be squeezed out and eventually make contact with the capstan 50 and/or the idler wheel 51. If the surface of the capstan 50 or idler wheel 51 became contaminated with the adhesive material, it is likely to cause damage to the magnetic recording tape 14 by stretching or otherwise deforming the magnetic recording tape 14.

Another form of the tape cassette recorder/playback unit utilizes optical detection techniques to sense an end-of-tape condition. In FIG. 4, a typical configuration is shown. Opening 17 in the combination of the patch 15, adhesive material 54, and magnetic recording tape 14 is made at a point midway from the edges of the edges of the magnetic recording tape 14. When the end of tape is reached, a combination of a typical optical detector 53 and light or reflection source 52 will provide for recognition through the use of opening 17. It is obvious that opening 17 could be placed wherever the optical detector equipment 52 and 53 is placed. When standardized, the opening 17 would be placed at a specific distance from the ends of the magnetic recording tape 14. The diameter of opening 17 should be no greater than one-half the width of the magnetic recording tape 14, this to insure strength of the combination patch 15 and the magnetic recording tape 14.

As will be apparent to one skilled in the art, many changes may be made to the present invention which are within the spirit and scope of this invention. Therefore, the only limitations placed on the scope of the invention are those limitations recited in the claims below.

What I claim is:

1. A combination of a cassette recording tape and strengthening patch therefor to be used with an apparatus including a rotating capstan and idler for applying force to and moving the recording medium, comprising:

a. a portion of magnetic recording tape adapted to be supported at ends thereof;

b. a strip of patching means for patching said magnetic recording tape; and c. adhesive means for connecting said patching means to said portion of said magnetic recording tape, said adhesive means disposed between said strip of patching means and said portion of said magnetic recording tape in all but an area a predetermined distance from ends of said strip of patching means, said area being substantially between the capstan and idler when an end of said portion of recording tape is reached.

2. A combination of a recording device and an apparatus including a rotating capstan for applying a force to and moving the recording device, said recording device comprising:

a. recording means for retaining recorded information and adapted to be supported at ends thereof;

b. patching means for patching said recording means; and c. adhesive means for connecting said patching means to said recording means, said adhesive means being disposed between said patching means and said recording means in all but an area a predetermined distance from ends of said strip of patching means, said area being contacted by the rotating capstan when said recording means has been moved to an end thereof.

3. A combination as defined in claim 2 wherein said recording means is magnetic recording tape adapted to be mounted in a tape cassette.

4. A combination of a recording medium and a strengthening patch therefor to be used with an apparatus including a rotating capstan for applying force to and moving the recording medium and a detector for detecting an end portion of the recording medium, comprising:

a. a portion of magnetic recording tape having top, bottom and side surfaces, said portion of magnetic recording tape having an opening from the top to the bottom surface at a given distance from an end thereof substantially aligning said opening with the detector;

b. a strip of patching means having top, bottom, and side surfaces for patching a predetermined area of said portion of magnetic tape apt to be worn by the rotating capstan, said strip of patching means having an opening from the top to the bottom surface thereof; and, c. adhesive means for connecting said top surface of said patching means to said bottom surface of said portion of magnetic recording tape aligning the centers of the openings in said patching means and said portion of magnetic recording tape, said adhesive means disposed between said patching means and said portion of magnetic recording tape in all but an area a predetermined distance from ends of said strip of patching means, said area being contacted by the capstan when the end portion of said recording tape is reached.

5. The combination as in claim 4 wherein the distance between the side surfaces of said strip of patching means is equal to or less than the distance between the side surfaces of said portion of magnetic recording tape.

6. A combination as in claim 4 wherein said openings in said strip of patching means and said portion of magnetic recording tape have diameters which are no greater than one-half the distance between the side surfaces of said portion of magnetic recording tape and said strip of patching means.

7. A combination as in claim 4 wherein said strip of patching means is mylar tape.

8. A combination of a recording medium and a strengthening patch therefor to be used with a recording/playback apparatus including a rotating capstan for applying force to and moving the recording medium and an optical detector for detecting an end portion of the recording medium, comprising:

a. a portion of magnetic recording tape having top, bottom, and side surfaces, said portion of magnetic recording tape having an opening therethrough from the top to the bottom surface thereof at a distance from an end thereof adapting said opening to be substantially aligned with the optical detector;

b. a strip of patching means having a top, bottom, and side surfaces strengthening a predetermined area of said portion of magnetic recording tape apt to be worn by the rotating capstan, said strip of patching means having an opening from the top to the bottom surface thereof; and, c. adhesive means for connecting said top surface of said patching means to said bottom surface of said portion of magnetic recording tape aligning the centers of said opening in said patching means and said portion of magnetic recording tape, said adhesive means disposed between said patching means and said portion of magnetic recording tape from ends of said strip of patching means leaving an area between said portion of magnetic recording tape and said strip of patching means which is devoid of said adhesive means, said area being in contact with the rotating capstan when an end portion of the recording tape is reached.

9. A combination as in claim 8 wherein said patching means is mylar tape.

10. A combination as in claim 8 wherein the distance between said side surfaces of said patching means is equal to the distance between said side surfaces of said magnetic recording tape.

11. A combination as in claim 8 wherein said magnetic recording tape is adapted to be mounted in a cassette.

12. A combination as in claim 8 wherein said openings in said strip of patching means and said portion of magnetic recording tape have diameters which are no greater than one-half the distance between the side surfaces of said portion of magnetic recording tape and said strip of patching means.